(12) United States Patent
Hanson et al.

(10) Patent No.: US 8,024,463 B2
(45) Date of Patent: Sep. 20, 2011

(54) SYSTEMS AND METHODS FOR TRACKING WEB ACTIVITY

(75) Inventors: Andrew Bard Hanson, Portland, OR (US); Martin Waugh, Portland, OR (US)

(73) Assignee: Webtrends, Inc., Portland, OR (US)

( * ) Notice: Subject to any disclaimer, the term of this patent is extended or adjusted under 35 U.S.C. 154(b) by 0 days.

(21) Appl. No.: 12/845,471

(22) Filed: Jul. 28, 2010

(65) Prior Publication Data

US 2010/0299434 A1 Nov. 25, 2010

Related U.S. Application Data (62) Division of application No. 10/965,156, filed on Oct. 15, 2004, now Pat. No. 7,792,954.

(60) Provisional application No. 60/558,708, filed on Apr. 2, 2004.

(51) Int. Cl.
*G06F 15/173* (2006.01)
*G06F 15/16* (2006.01)
*G06F 3/00* (2006.01)

(52) U.S. Cl. ............ 709/224; 709/219; 715/745

(58) Field of Classification Search .......... 709/223–224, 709/219; 715/745
See application file for complete search history.

(56) References Cited

U.S. PATENT DOCUMENTS

| | | | |
|---|---|---|---|
| 5,774,670 A | 6/1998 | Montulli | |
| 6,073,241 A * | 6/2000 | Rosenberg et al. | ........ 726/3 |
| 6,112,238 A | 8/2000 | Boyd et al. | |
| 6,317,787 B1 | 11/2001 | Boyd et al. | |
| 6,360,261 B1 | 3/2002 | Boyd et al. | |
| 6,393,479 B1 | 5/2002 | Glommen et al. | |
| 6,763,383 B1* | 7/2004 | Evison et al. | ........ 709/224 |
| 6,766,370 B2 | 7/2004 | Glommen et al. | |
| 7,039,699 B1 | 5/2006 | Narin et al. | |
| 2003/0037131 A1* | 2/2003 | Verma | ........ 709/223 |

FOREIGN PATENT DOCUMENTS

| | | |
|---|---|---|
| WO | 0139084 A1 | 5/2001 |
| WO | 0157615 A2 | 8/2001 |
| WO | 0167313 A1 | 9/2001 |

OTHER PUBLICATIONS

International Search Report and Written Opinion, Jul. 27, 2005, PCT/US2005/010149.
Kristol, D. and Montulli, L., "HTTP State Management Mechanism," Netscape Communications, Network Working Group, RFC 2109, Feb. 1997, pp. 1-21.
Microsoft.NET Passport SGK, .Net Passport Service Guide Kit, Version 2.5, Internet Printed Version, pp. 1-305, Jan. 11, 2005.

* cited by examiner

*Primary Examiner* — Peling Shaw
(74) *Attorney, Agent, or Firm* — Marger Johnson & McCollom, P.C.

(57) ABSTRACT

Systems and methods of tracking activity over networks and, in particular, tracking web activity over the Internet are described. Exemplary systems and methods may include a receiver for receiving a request from a visitor for a data object, a processor for providing a cookie to track the visitor's web activity, and a transmitter for transmitting the cookie to the visitor in response to the request. The cookie may comprise tracking information for a plurality of web sites visited by the visitor.

15 Claims, 6 Drawing Sheets

SYSTEMS AND METHODS FOR TRACKING WEB ACTIVITY

RELATED APPLICATION DATA

This application is a division of U.S. application Ser. No. 10/965,156, filed Oct. 15, 2004, now U.S. Pat. No. 7,792,954, issued Sep. 7, 2010, which claimed the benefit of U.S. application Ser. No. 60/558,708, filed Apr. 2, 2004, all herein incorporated by reference.

BACKGROUND

I. Technical Field

The present invention generally relates to systems and methods for collecting, tracking, and/or storing information over a network. More particularly, the invention relates to using state objects, such as cookies, to track web activity over the Internet.

II. Background and Material Information

The advent of the Internet and, more specifically, its sub-component known as the World-Wide Web has created a new avenue for people to communicate and interact with each other. Worldwide, the Internet is estimated to have over 750 million users, and the United States alone is estimated to have over 150 million users. Recognizing the potential of this resource, businesses have exploited the Internet in many ways, including marketing, on-line purchasing, e-commerce, etc. using websites on the World-Wide Web. As businesses have employed the Internet in increasingly more sophisticated ways, it has become increasingly necessary for them to analyze and evaluate the effect of the Internet on their business models. For example, businesses have recognized the importance of tracking the activity of their customers and have started using tracking services to record traffic data of visitors at their web sites. This information can be very important, because often times, it is used to make critical decisions on marketing strategy. However, existing technologies are limited in their ability to collect, track, store, and/or analyze this information. Accordingly, it would be beneficial to provide a better way to collect, track, store, and/or analyze web activity.

SUMMARY OF ASPECTS OF THE INVENTION

Features and principles consistent with the present invention may improve the tracking of activity over networks and, in particular, may improve the tracking of web activity over the Internet.

One exemplary aspect of the invention relates to a method for tracking web activity. The method may comprise receiving a request from a visitor for a data object, providing a cookie to track the visitor's web activity, and transmitting the cookie to the visitor in response to the request. The cookie may comprise tracking information for a plurality of web sites visited by the visitor.

Another exemplary aspect of the invention relates to a method for obtaining web activity information. The method may comprise receiving a web page request from a visitor, providing the requested web page, and transmitting the requested web page. The web page may comprise code to obtain a cookie, and the cookie may comprise tracking information for a plurality of web sites visited by the visitor.

Another exemplary aspect of the invention relates to a method for gathering web activity information. The method may comprise requesting a page from a site, and receiving the page. The page may comprise instructions to obtain a cookie, and the cookie may comprise tracking information for a plurality of sites visited by a visitor.

Another exemplary aspect of the invention relates to a system for tracking web activity. The system may comprise a processor configured to implement a method of obtaining and gathering web activity information and tracking the web activity.

Another exemplary aspect of the invention relates to a computer-readable medium comprising instructions to configure a system to obtain and gather web activity information and track the web activity, consistent with embodiments of the invention.

Additional aspects of the invention are set forth in the detailed description which follows or may be learned by practice of methods, systems, and articles of manufacture consistent with the present invention. It is understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects and embodiments of the invention and together with the description, serve to explain principles of the invention. In the drawings.

DETAILED DESCRIPTION

Reference is now made in detail to exemplary aspects of the invention, examples and embodiments of which are illustrated in the accompanying drawings. Wherever possible, the same reference numbers are used throughout the drawings to refer to the same or like parts.

For the purposes of this application, the tracking of web activity over the Internet is discussed. However, as one of ordinary skill in the art will appreciate, the principles of the present invention may be applied to the collection, storage, and/or tracking of any information, such as client information or database information, over any network, such as a local area network, an intranet, an extranet, etc. Accordingly, features and principles of the present invention are not limited to the tracking of web activity, but are equally applicable to the collection, storage, and/or tracking of other information over any distributed environment.

According to features and principles of the present invention, web site activity may be tracked using state objects to store state information. Included in the state information may be a description of a range of URLs for which that state information should be repeated back to a server. When a client system sends Hyper-Text Transfer Protocol (HTTP) requests to servers that fall within the range of the defined URLs, the requests will include a transmittal of the current value of the state object. By adding the ability to transfer state information back and forth, servers can play an active role in tracking transactions between the clients and servers.

One example of a state object is a cookie. Cookies are messages given to a web browser by a web server. The browser typically stores the message in a text file and the message is usually sent back to the server when the browser requests a page from the server.

One purpose of cookies may be to identify users. This can allow the server to prepare customized web pages for them. For example, when a user accesses a web site employing cookies, he may be asked to fill out a form providing information, such as his name and interests. This information may be packaged into a cookie and sent to his web browser, which stores it for later use. Alternatively, the information may be stored on the web server and the cookie may contain a value that the web server uses to access the stored user information. The next time the user visits the same web site, his browser may send the cookie to the web server because browsers are generally configured to send a cookie upon initial access, if the cookie exists. The server can use the cookie to present customized web pages to the user. So, for example, instead of seeing just a generic welcome page, the user might see a welcome page with his name on it. The server can also use the cookie to record information regarding the user's web activity, such as his last visit to the web site. The web server can recall this recorded information from the cookie when the user next visits the web site.

Third-party tracking services may also use cookies to track the web activity at a web site. That is, rather than having the business keep track of the web activity on its web site, the third-party tracking service may track the web activity for the business. Such services typically are notified of each web site visit through Internet communication features of the HTTP specification and may prepare statistical reports for the business.

Internet-based analysis tools typically rely on special HTML code inserted into the page at a web site. These web pages usually contain a mixture of text and graphical elements that a visitor's browser retrieves by opening subsequent connections and requesting files, such as images or frames. The visitor's browser displays the graphical elements by retrieving a source location attribute (also referred to as the source Uniform Resource Locator, or URL) of the graphical element, opening a connection to the source location, and retrieving the data bytes that comprise the image file. Internet-based analysis tools, such as third party-tracking services, can count requests for a source file regardless of the actual location of the source file. Thus, a graphical element can be retrieved from a server that is in a different location from the primary web site file server.

A tracking service may use embedded HTML code, usually containing a graphical element as described above, with a source location attribute directing a browser to the computers of the tracking service. When a visitor receives a business's web site page, the visitor's browser will request all of the images on the page, including the graphical element source. At the same time, headers that are automatically supplied with the browser request for the page will reveal information about the web site visitor. The tracking service will gather and store the information about the web site visitor, and return requested data, such as a graphical image, to the web site visitor's browser. The embedded HTML code may also contain scripts that gather more information (such as monitor resolution, etc.) about the web site visitor. This additional information may be included with the request headers.

In this way, a tracking service can provide traffic statistics in real-time by recording each request for a web site page when the request occurs. That is, each web site visit generates a "hit" statistic that can be accumulated from all the visitors to produce a count of requests for the web site pages. The tracking service may interpret these hits as a count of the number of visits to the web site and perform other traffic analyses, such as frequency of visits, average time intervals between visits, etc.

Figure 1:
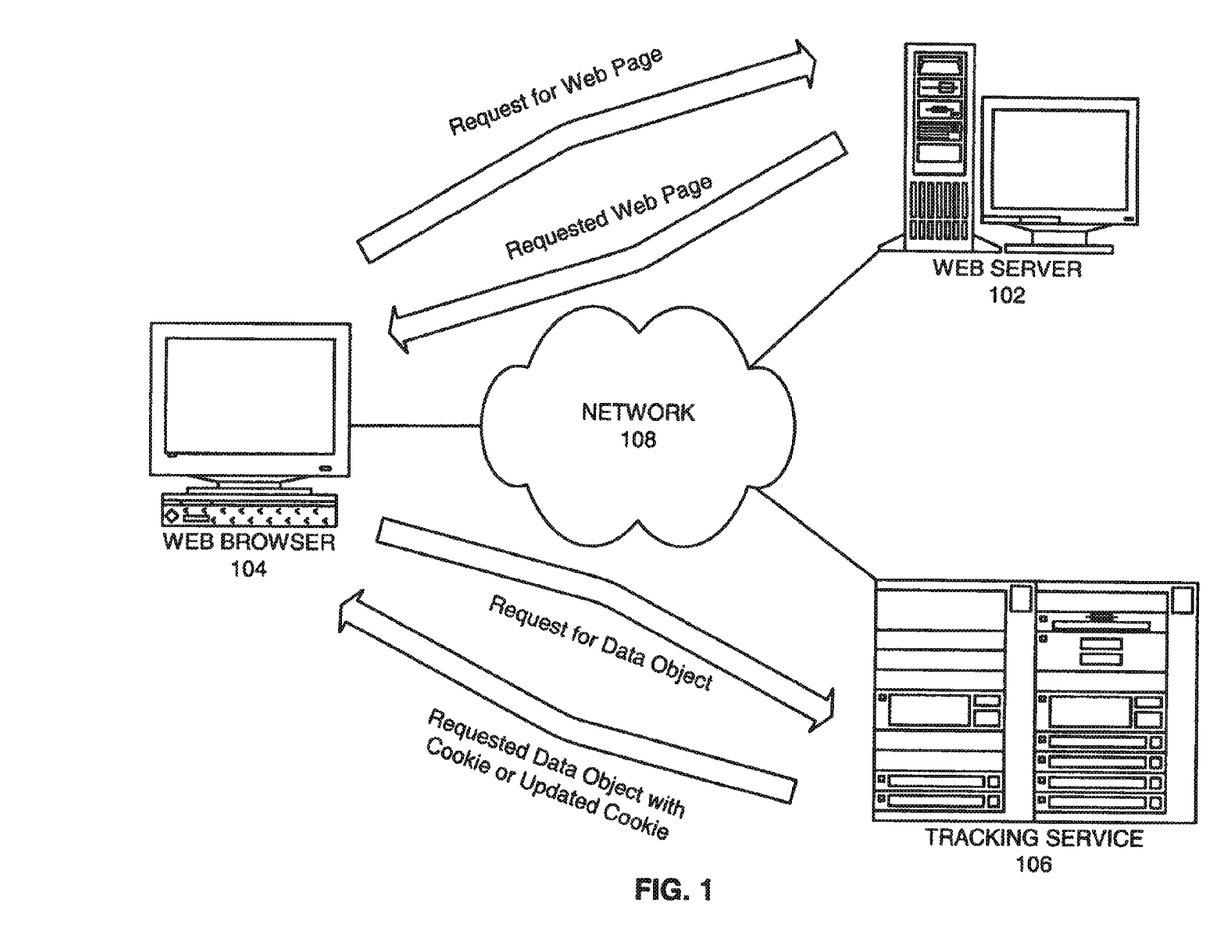
FIG. 1 illustrates an exemplary system for tracking web activity, consistent with an embodiment of the present invention.

System 100 in FIG. 1 illustrates an exemplary third-party tracking service that uses cookies to help track the web activity at a business's web site. System 100 may comprise a web server 102, a web browser 104, and a third-party tracking service 106. Server 102, browser 104, and tracking service 106 may communicate over network 108. Server 102 may be configured to provide access to its web sites over network 108. Web browser 104 may allow a user to visit and/or browse the web sites on server 102. Tracking service 106 may track the web activity of the visitor browsing the web sites at server 102.

Tracking service 106 may track the web activity, as follows: (1) web pages provided by server 102 may include a small amount of client-side executable code, typically JavaScript, on each page to be tracked; (2) when that page is loaded by a visitor's browser program at browser 104, the browser program executes the JavaScript, resulting in a request to tracking service 106 for a data object, typically an "invisible" image (e.g., an image that is only one pixel by one pixel in size) but may include other types of data; (3) the request may include a string that identifies the tracked web site; (4) tracking service 106 updates data about the visitor's traffic on the tracked web site, and returns the data object to browser 104, along with a small amount of data, such as a cookie, to store on browser 104; (5) the cookie typically contains some data about traffic from the visitor to the tracked site, such as the date and time of the most recent visit or request, and can contain more information, such as pages previously requested; (6) the next time the visitor loads a page from the tracked web site at server 102 and the JavaScript requests the data object from tracking service 106, browser 104 sends the stored cookie along with the request to tracking service 106, per the HTTP specification; (7) tracking service 106 uses the data in the cookie to update traffic history for the tracked site, updates the cookie, and sends the updated cookie back to browser 104 with the requested data object. In this manner, tracking service 106 may use the cookie to collect information, such as statistics on the visitor's web activity at the web site on server 102, so that businesses may make informed decisions about the effectiveness of their web sites.

Each of server 102, browser 104, and tracking service 106 may be implemented by a general purpose computer or data processor selectively activated or reconfigured by a stored computer program, or may be a specially constructed computing platform for carrying out the features and operations disclosed herein. Alternatively, server 102, browser 104, and tracking service 106 may be implemented on the same processor or computing platform. Or, server 102 may include a plurality of servers with different web sites for a plurality of respective businesses that employ tracking service 106 to track the web activity of visitors visiting their web sites. Web browser 104 may include a plurality of web browsers for a plurality of respective visitors visiting the web sites.

Figure 2:
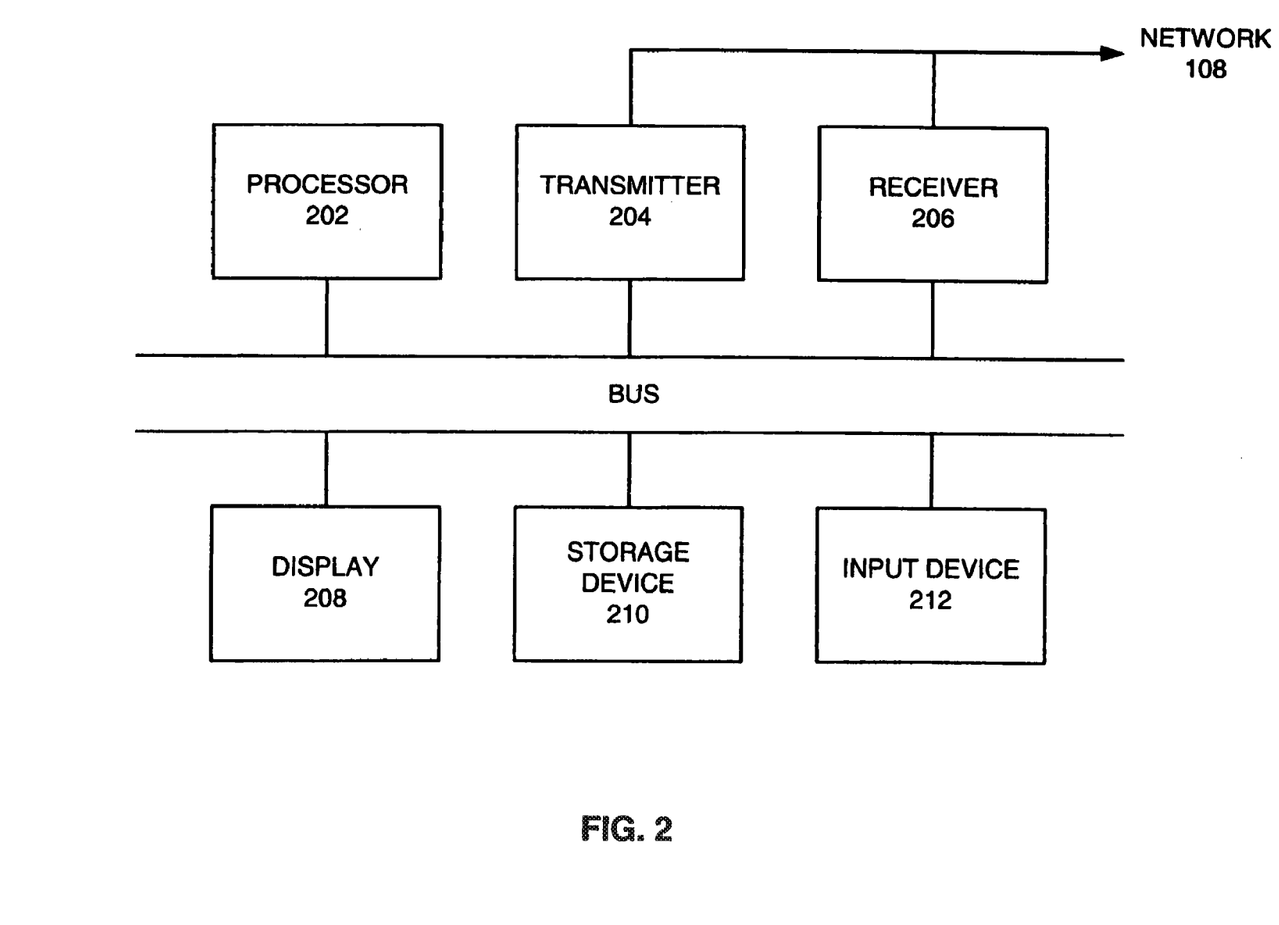
FIG. 2 illustrates an exemplary server, browser, or tracking service, consistent with an embodiment of the present invention.

In one embodiment consistent with the invention, server 102, browser 104, and tracking service 106 may each comprise a processor 202, a transmitter 204, a receiver 206, a display 208, a storage device 210, and an input device 212, as illustrated in FIG. 2. Transmitter 204 and receiver 206 may transmit and receive information between server 102, web browser 104, and/or tracking service 106 over network 108.

Transmitter 204 and receiver 206 may include a network interface, such as a network card, Bluetooth interface, TCP/IP interface, or any other device for conveying information. Network 108 may comprise a local area network, an intranet, an extranet, the Internet, a wide area network, a metropolitan area network, a campus area network, a home area network, a virtual network, a telephone network, a wired network, a wireless network, or any other mechanism for communicating between server 102, browser 104, and tracking service 106.

According to features and principles of the present invention, some third-party tracking services may store a cookie on a visitor's browser for each tracked site. The HTTP specification provides for identifying cookies with a name and a "path." One cookie can be stored for each tracked site under its own path. However, a problem may arise when using cookies to store web site activity data for third-party tracking. Under the HTTP specification, only 20 cookies are allowed for a single domain. If a tracking service were to store all the cookies under its own domain, such as netiq.com, and used a separate cookie to store data for each customer, then that service may only be able to track a maximum of 20 web sites for any given visitor. If the tracking services attempts to store more than this number, the browser may arbitrarily discard enough previously stored cookies to keep just 20. This may cause over-counting of some tracked statistics and measurements, such as the number of unique visitors, and under-counting of other tracked statistics and measurements, such as the number of return visitors. Some browsers may be more lenient about the 20-cookie limit, but the HTTP specification sets an upper bound to the number of cookies that can be relied on by a web site at a given domain.

One way of overcoming the 20-cookie limit may be for the tracking service to set up a separate tracking domain for every customer. However, this approach may break down when a single customer has more than 20 separate web site areas or sub-domains that it wishes to track. Additionally, this can be very costly, and in many cases, may not be feasible because unique IP addresses and certificates would be required for each domain. Further, if Secure Sockets Layer (SSL) support is required, one would need two domains/IPs/certificates (one SSL, and one non-SSL) for each web site. SSL domains are much more expensive than non-secure domains, and more trouble because each one requires its own separate IP address. However, some visitors might be strongly adverse to a business sending any information related to their web activity over the Internet. If they believe that a web site is making such information visible, then they might avoid the web site. This behooves tracking services to use secure communications between the visitor's web browser and the tracking service, but to do so using a separate tracking domain for every customer could be cost-prohibitive.

According to features and principles of the present invention, system 100 may store the web site data for multiple web sites in a single cookie, which allows many more sites to be tracked in each cookie. Particularly, per the HTTP specification, the cookie field sent from a visitor's browser to the tracking service is generally limited to 4096 bytes. System 100 may more efficiently use the limited space provided by each cookie by storing information for multiple tracked sites in this space. Further, tracking service 106 may compress and/or encrypt the cookie data using any of various algorithms, such as run-length encoding and Lempel-Ziv.

Hence, depending on the exact algorithms used for representing information stored in a cookie and the compression algorithms used, tracking service 106 may extend the number of web sites that can be simultaneously tracked for an individual visitor from 20 to a few hundred. Using additional cookies (up to the 20 allowed for each domain) and/or multiple domains, system 100 may extend the number of tracked sites for each visitor into the thousands. This may be very useful for tracked web sites that have many sub-domains to be tracked.

For example, Table 1 below illustrates exemplary tracking information for multiple web sites in a cookie consistent with features of the present invention.

TABLE 1

Exemplary Tracking Information in a Cookie

| DATA TYPE | EXEMPLARY VALUE |
|---|---|
| Visitor's Unique ID | 62.254.64.15-4140951152.29648388 |
| Number of Sites Tracked for this Visitor | 5 |
| List of Sites and Visitor's Activity on Sites (below) | — |
| Site ID | 3 |
| Access Date | 103620 |
| Last Visit Start Date | 77520 |
| Site ID | 4 |
| Access Date | 4740 |
| Last Visit Start Date | 4740 |
| Site ID | 5 |
| Access Date | 6540 |
| Last Visit Start Date | 5340 |
| Site ID | 6 |
| Access Date | 8340 |
| Last Visit Start Date | 7140 |
| Site ID | 8 |
| Access Date | 12840 |
| Last Visit Start Date | 12180 |
| Number of Accounts Tracked for this Visitor | 2 |
| List of Accounts and Visitor's Activity on Sites for these Accounts (below) | — |
| Account ID | 3 |
| Access Date | 103620 |
| Last Visit Start Date | 77520 |
| Account ID | 5 |
| Access Date | 12840 |
| Last Visit Start Date | 12180 |

The data in Table 1 may be packed into a compact string, such as for example: "62.254.64.15-4140951152.29648388|5|3|103620|77520|4|4740|4740|5|6540|5340|6|8340|7140|8|12840|12180|2|3|103620|77520|5|12840|12180." The string may then be check-summed, encrypted, compressed, and/or converted from binary to text.

Figure 3A:
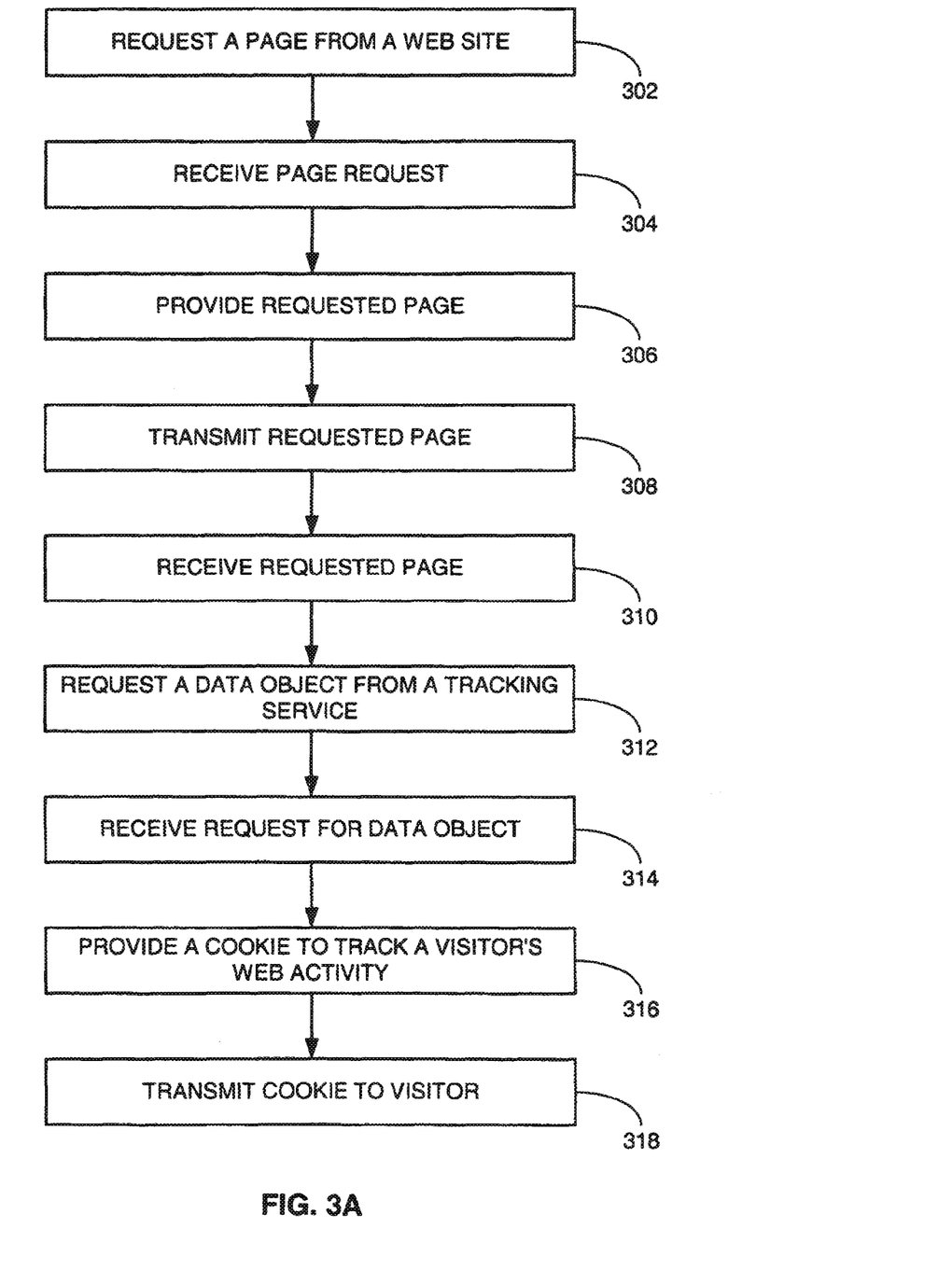
FIGS. 3A-3C illustrate an exemplary method of tracking web activity, consistent with an embodiment of the present invention.
Figure 3B:
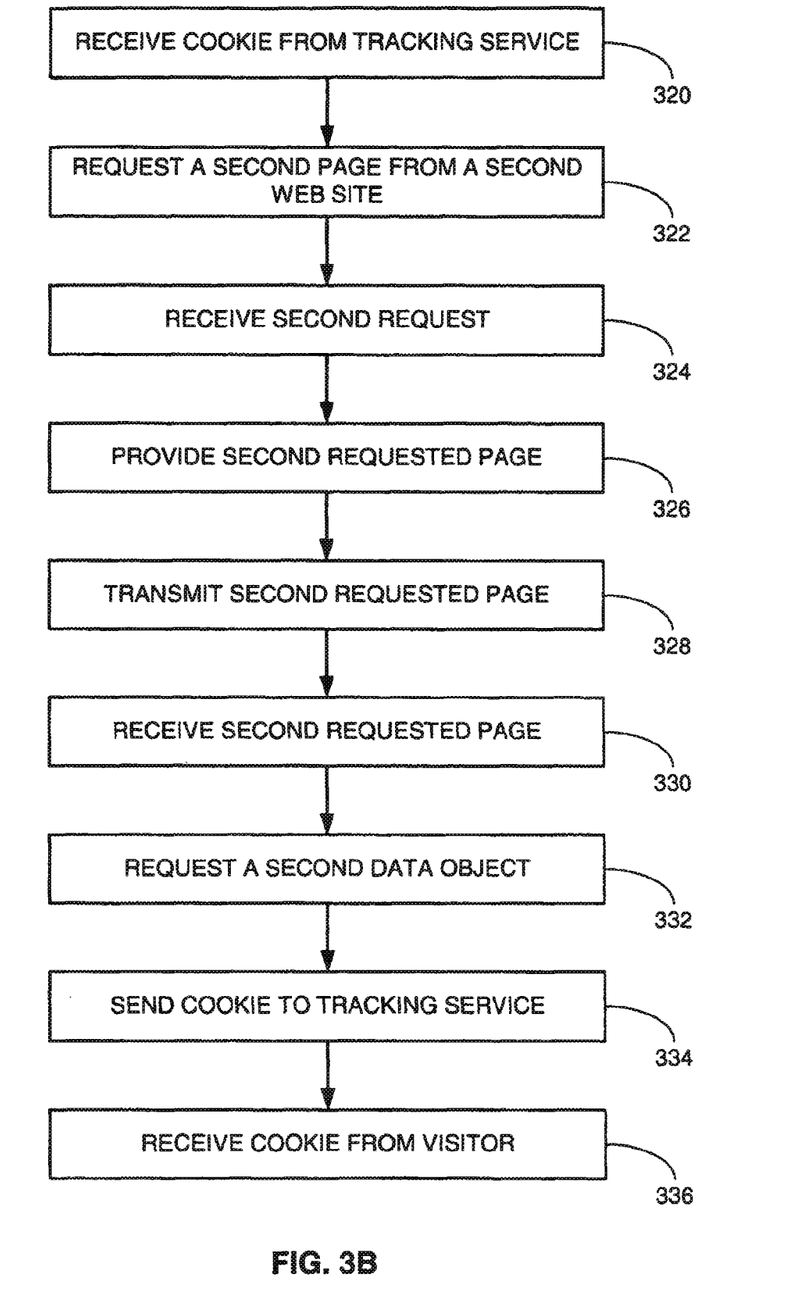
Figure 3C:
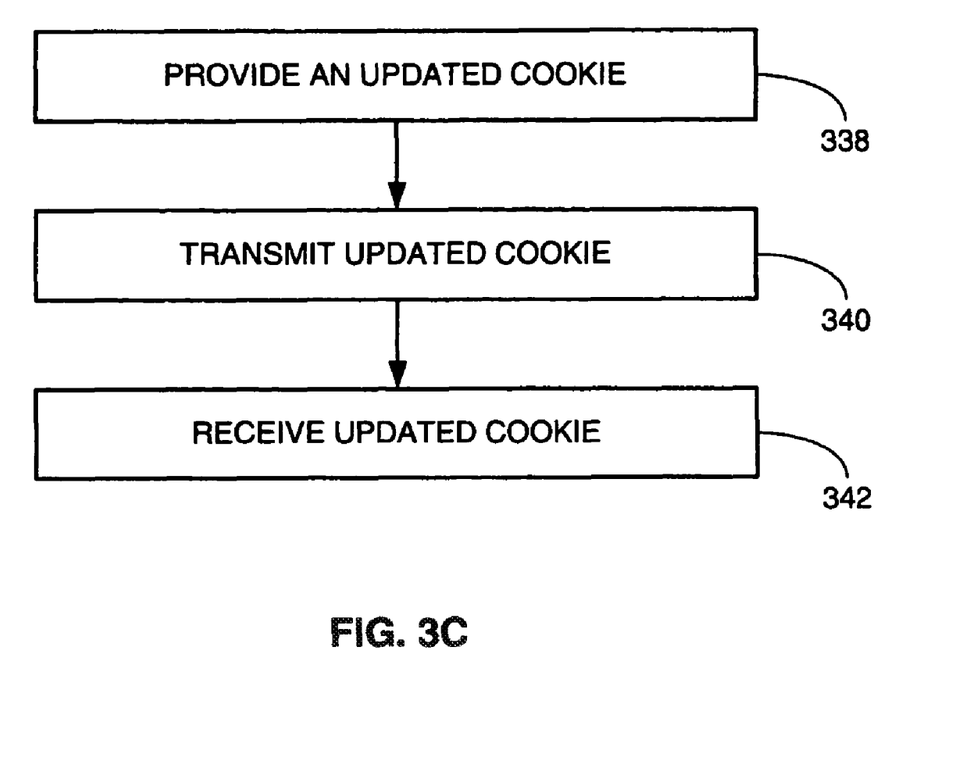

FIGS. 3A-3C illustrate an exemplary method of tracking web activity using a cookie containing tracking information for multiple web sites, consistent with features and principles of the invention. System 100 (in FIG. 1) may perform this method. Particularly, a visitor may use browser 104 to request a page from a tracked web site at server 102 (step 302 in FIG. 3A). Server 102 may receive the request from the visitor (step 304), provide the requested page (306), and transmit the requested page (step 308). Browser 104 may receive the requested page from server 102 (step 310). The page may include code to obtain a data object. The code may be instructions embedded in the page, such as JavaScript. Browser 104 may execute the code and request the data object from tracking service 106 (step 312). In the request, browser 104 may send to tracking service 106, the type of content in the page and other content information about the page. Browser 104 may also send to tracking service 106, a unique identifier for the tracked web site. The content information, unique web site identifier, and any other relevant information may be transmitted in the URL parameters of the request for the data object. Tracking service 106 may receive the request for the data object (step 314). If the visitor has previously visited the tracked web site, tracking service 106 may also receive an old cookie from browser 104 and may use information in the URL parameters, such as the web site identifier, to lookup a date and a time of the previous visit in the old cookie.

In response to the data object request, tracking service 106 may provide a new cookie to track the visitor's web activity (step 316). Tracking service 106 may include information in the new cookie based on any data included in the request for the data object, such as the URL parameters, or the old cookie from browser 104. For example, tracking service 106 may include in the new cookie, the web site's unique identifier and the most recent date and time that the visitor requested the page at the web site. Tracking service 106 may transmit the new cookie to the visitor (step 318). Browser 104 may receive the cookie (step 320) and may store the cookie in a storage device. The cookie may also include a unique identifier for the visitor. The unique visitor identifier and other information in the cookie may be retrievable for later use. For example, those of ordinary skill in the art will recognize that a cookie can be used to timestamp a web site visitor. The timestamp value and the visitor's IP address may be combined, stored, and used to uniquely identify a visitor. Alternatively, as one of ordinary skill in the art will appreciate, other techniques to uniquely identify a web site visitor may also be used.

Browser 104 may request a second page from a second tracked web site (step 322). The second web site may be located at server 102 or at another server similar to server 102. Server 102 or the other server may receive the second request for the second page (step 324), provide the second requested page (step 326), and transmit the second requested page (step 328). Browser 104 may receive the second requested page (step 330). The second page may comprise code to obtain a second data object from tracking service 106. Browser 104 may execute the code to request a second data object (step 332) and send the second data object request to tracker service 106. The second data object may be the same as or different from the first data object in step 312. Along with the second data object request, browser 104 may send the cookie received and stored at step 320 to tracking service 106 (step 334). Tracking service 106 may receive the cookie (step 336) and the second data request, provide an updated cookie (step 338), and transmit the updated cookie (step 340). Browser 104 may receive the updated cookie (step 342) and store the updated cookie in a storage device.

Consistent with the invention, the cookie may include tracking information for a plurality of web sites visited by the visitor. The tracking information may comprise a unique visitor identifier, one or more site/time pairs corresponding to web sites visited by the visitor at steps 302 and 322 (in FIGS. 3A and 3B), and/or any other relevant information. From this tracking information, tracking service 106 or a separate analysis service may compute a panoply of statistics and measurements about traffic at any tracked web site, including, but not limited to, the number of unique visitors to a tracked web site for various time periods, the number of visits the visitor has undertaken, and paths through the tracked web site's pages.

For example, to correlate visitors' behavior with particular time periods, it may be necessary to know the date and time each page request occurred and the delay between each request and the previous request for the same visitor. It is possible to store every combination of visitor and web site identifiers in a database and lookup the previous request time whenever a new request comes in. However, such an approach, may be time-consuming. Instead, the date and time of the previous request from the visitor may be stored in a cookie. This creates a very large, distributed database of previous request times indexed by visitor and site. Particularly, in the above example, the cookie may include tracking information on the first web site and the second web site visited by the visitor. The tracking information may comprise unique identifiers for each of the first web site and the second web site and corresponding dates and times for the last request time of each web site.

A third-party tracking service potentially has many customers. Hence, in the above example, the first web site and second web site may belong to different customers on different servers. Tracking service 106 may track each customer's web site separately, so that each customer views reports for only the traffic on their sites. This may require a separate set of data for each customer to be stored in the cookie or plurality of cookies on the visitors' computer. Additionally, a single customer may need to track multiple web sites, or distinct portions of a single web site. Each of these may require a separate set of data in the cookie or plurality of cookies.

As previously mentioned, tracking information stored in a cookie may be compressed to further increase the number of sites that may be tracked under a given domain name. For example, tracking service 106 may encode and/or compress a visitor's tracked web activity for multiple sites and store the encoded and/or compressed web activity in a cookie. Encoded and/or compressed tracking information may be stored in multiple cookies under one domain or in multiple cookies under multiple domains. Whenever tracking service 106 receives a data object request from browser 104, tracking service 106 may receive one or more cookies, extract tracking information from the one or more cookies, update the tracking information, encode and/or compress the updated tracking information, store the compressed tracking information in one or more cookies, and return the updated cookie(s) to browser 104.

Figure 4:
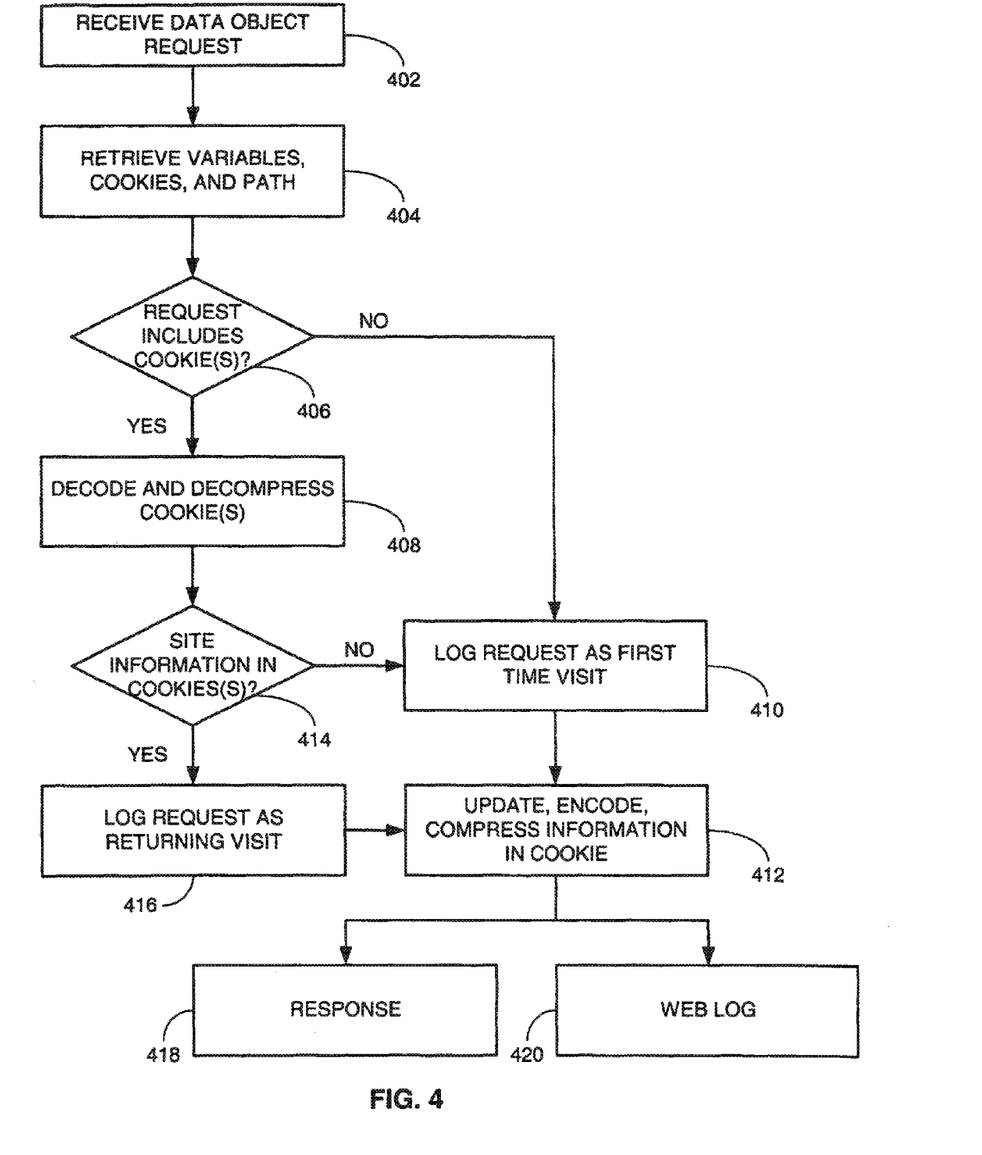
FIG. 4 illustrates an exemplary method of encoding and/or compressing tracking information, consistent with an embodiment of the present invention.

FIG. 4 illustrates an exemplary method 400 of encoding and/or compressing tracking information for multiple web sites in a cookie. System 100 may perform method 400. Particularly, tracking service 106 may receive a data object request from a visitor that is using browser 104 to download a page from a tracked web site (step 402). Tracking service 106 may retrieve the path, any included cookie(s), and any other variables from the request (step 404). The path of the request may include a unique identifier for the tracked site. If no cookie(s) are included with the request (step 406), tracking service 106 may log the request as a first time visit to the tracked site by the visitor (step 410), and update the cookie(s) to add tracking information reflecting the first time visit (step 412). The tracking information may be encoded and/or compressed by tracking service 106.

Alternatively, if cookie(s) are included with the request, tracking service 106 may decode and decompress the cookies(s) to extract tracking information from the cookie(s) (step 408). Tracking service 106 may check the extracted tracking information for previous visits to the tracked site (step 414). If there is no information regarding previous visits, then tracking service 106 may log the request as a first time visit to the tracked site (step 410). If there is information for the tracked site, then tracking service 420 may log the request as a return visit to the tracked site by the visitor (step 416), and update the tracking information in the cookie to reflect the return visit (step 412). Tracking service may respond to the data object request by returning the requested data object along with the updated cookie to browser 104

(step 418). Additionally, tracking service 106 may also carry out any additional actions, such as updating a web log for the web activity (step 420).

One of ordinary skill in the art will appreciate that features and principles of the present invention may be implemented in a computer-readable medium (e.g., floppy disk, CD-ROM, storage device, etc.) containing instructions for a system, such as system 100, and/or portions thereof to execute the instructions.

In the foregoing description, various features are grouped together for purposes of streamlining the disclosure. This method of disclosure is not to be interpreted as reflecting an intention that the claimed invention requires more features than are expressly recited in each claim. Rather, as the following claims reflect, inventive aspects may lie in fewer than all features of a single foregoing disclosed embodiment and various features of different embodiments may be combined. Thus, the following claims are hereby incorporated into this description, with each claim standing on its own as a separate embodiment of the invention.

The embodiments and aspects of the invention set forth above are not restrictive of the invention as claimed. Other embodiments consistent with features and principles are included in the scope of the present invention. For example, the order of steps carried out in disclosed embodiments may vary. Further, other embodiments of the invention will be apparent to those skilled in the art from consideration of the specification and practice of the invention disclosed herein. Therefore, it is intended that the specification and examples be considered as exemplary and explanatory only.

The invention claimed is:

1. A system, comprising:
   a receiver for receiving a request from a visitor for a data object;
   a processor for providing a cookie to track the visitor's web activity; and
   a transmitter for transmitting the cookie to the visitor in response to the request, wherein the cookie comprises tracking information for a plurality of web sites visited by the visitor;
   wherein the receiver receives a second request for a data object from the visitor and receives the cookie from the visitor, wherein the processor decompresses tracking information in the received cookie, wherein the processor provides an updated cookie according to the received cookie, wherein the transmitter transmits the updated cookie to the visitor in response to the second request, and wherein the updated cookie comprises updated tracking information for the plurality of web sites visited by the visitor.

2. The system of claim 1, wherein the cookie comprises a message given to the visitor's web browser by a web server, and the message is sent back to the web server when the web browser requests the data object from the web server.

3. The system of claim 1, wherein the cookie comprises at least one of a persistent cookie, a permanent cookie, and a stored cookie.

4. The system of claim 1, wherein the cookie comprises an identifier for the visitor and a plurality of site/time pairs corresponding to the plurality of web sites.

5. The system of claim 1, wherein the transmitter transmits a plurality of cookies to the visitor in response to the request, and wherein the plurality of cookies comprises the tracking information for the plurality of web sites visited by the visitor.

6. The system of claim 1, wherein the processor compresses the tracking information in the cookie.

7. The system of claim 1, wherein the requested data object comprises a data object requested according to instructions embedded in a web page of a web site to be tracked.

8. A method for tracking web activity, the method comprising:
   receiving a request on a web server from a visitor for a data object;
   providing a cookie to track the visitor's web activity;
   transmitting the cookie to the visitor in response to the request, wherein the cookie comprises tracking information for a plurality of web sites visited by the visitor;
   receiving a second request for a data object from the visitor;
   receiving the cookie from the visitor;
   decompressing tracking information in the received cookie;
   providing an updated cookie according to the received cookie; and
   transmitting the updated cookie to the visitor in response to the second request,
   wherein the updated cookie comprises updated tracking information for the plurality of web sites visited by the visitor.

9. The method of claim 8, wherein the cookie comprises a message given to a visitor's web browser by the web server, and the message is sent back to the web server when the web browser requests the data object from the web server.

10. The method of claim 8, wherein the cookie comprises at least one of a persistent cookie, a permanent cookie, and a stored cookie.

11. The method of claim 8, wherein the cookie comprises an identifier for the visitor and a plurality of site/time pairs corresponding to the plurality of web sites.

12. The method of claim 8, further comprising transmitting a plurality of cookies to the visitor in response to the request, wherein the plurality of cookies comprises the tracking information for the plurality of web sites visited by the visitor.

13. The method of claim 8, further comprising compressing the tracking information in the cookie.

14. The method of claim 8, wherein the requested data object comprises a data object requested according to instructions embedded in a web page of a web site to be tracked.

15. A computer-readable medium comprising instructions to configure a processor to perform the method of claim 8.

* * * * *